J. LARKIN.
Evaporating Pan.
No. 26,851.
Patented Jan'y 17, 1860.
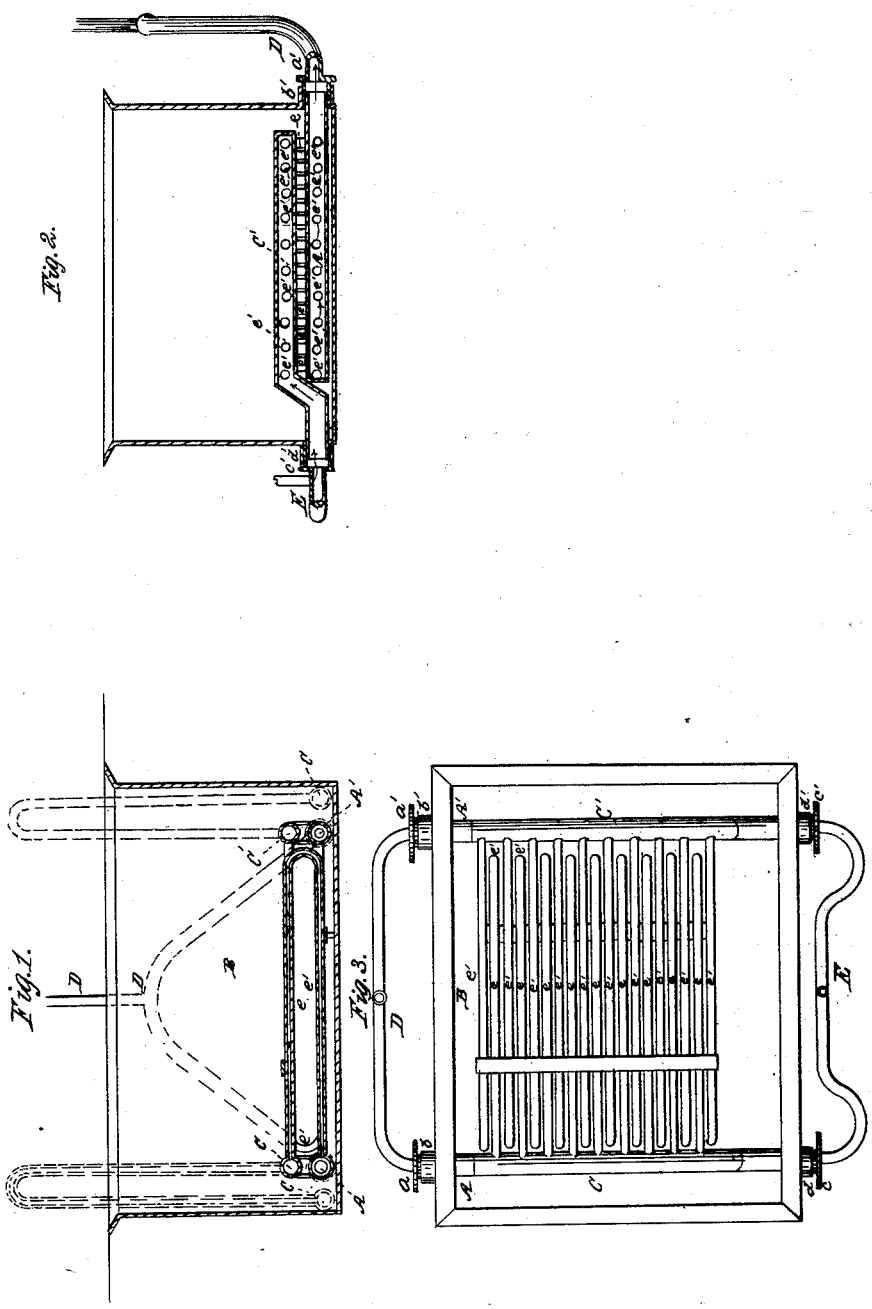
Witnesses:
Inventor:

UNITED STATES PATENT OFFICE.

JOHN LARKIN, OF THIBODEAUX, LOUISIANA.

IMPROVEMENT IN EVAPORATORS FOR SUGAR-PANS.

Specification forming part of Letters Patent No. 26,851, dated January 17, 1860.

*To all whom it may concern:*

Be it known that I, JOHN LARKIN, of Thibodeaux, in the parish of La Fourche and State of Louisiana, have invented a new and Improved Arrangement of Steam-Pipes in Boiling or Evaporating Vessels; and I do hereby declare that the following is a full, clear, and exact description of the same, reference being had to the accompanying drawings, forming part of this specification, in which—

Figures 1 and 2 are vertical sections at right angles to each other of a sugar-pan having my improved arrangement of pipes. Fig. 3 is a plan of the same.

Similar letters of reference indicate corresponding parts in the several figures.

My invention consists in a certain arrangement of the steam-pipes in a vessel for evaporating by steam, whereby, while convenience is afforded for raising the pipes to clean them or the bottom of the vessel, provision is made for the various degrees of expansion to which the several portions of the pipes are subject during the heating, boiling, or evaporating process.

To enable others skilled in the art to make and use my invention, I will proceed to describe its construction and operation.

E is the main steam-pipe with two branches, to the ends of which are attached glands $c\ c'$, which fit into two horizontal and parallel stuffing-boxes, $d\ d'$, in the same side of the pan B, but near opposite ends of and near the bottom thereof.

D is the main exhaust-pipe with two branches, to the ends of which are attached glands $a\ a'$, which fit into two horizontal and parallel stuffing-boxes, $b\ b'$, on the opposite side of the pan to the stuffing-boxes $d\ d'$. The axis of the stuffing-box $d$ is exactly opposite to and in line with that of $b$, and the axis of the stuffing-box $d'$ exactly opposite to and in line with that of $b'$, and the said axes are parallel with the ends of the pan when the latter is of quadrangular form, as represented.

A A' are two straight horizontal pipes, each closed at one end and open at the other, having their open ends fitted to the stuffing-boxes $b\ b'$ and extending nearly across the pan. C C' are two other pipes, which, like A A', are closed at one end and open at the other. These pipes are straight for the greater portion of their length from their closed ends, but have each a bend near the open end, and are again straight for some distance from their open ends. The object of the bend is that while their longer portions occupy positions above and parallel with A A' the portions next the open ends may range in line with A A' and fit the stuffing-boxes $d\ d'$. The pipe C is connected with that A by a series of smaller pipes, $e\ e$, and the pipe C' with the pipe A' by a series of similar pipes, $e'\ e'$, the said pipes $e\ e$ and $e'\ e'$ having U-shaped bends, as shown in Fig. 1, and being respectively arranged at right angles to the pipes A A' and C C', and in such a manner that $e\ e$ alternate with or are interposed between $e'\ e'$, as shown in Fig. 3. The pipes are all intended to be made of copper, and the pipes $e\ e$ and $e'\ e'$ are united with their respective pipes A A' and C C' by brazed joints. The connection of the pipes A A' with their respective pipes C C', by means of the pipes $e\ e$ and $e'\ e'$, keep them in line with each other, so that the pipes A and C and the pipes A' and C' may, respectively, turn together in their respective stuffing-boxes to bring the pipes $e\ e$ and $e'\ e'$ to vertical positions, as shown in red outline in Fig. 1, for the purpose of cleaning the exterior of said pipes and the bottom of the pan when necessary, and when the sets of pipes are in these positions the upper straight portions of the pipes C C' are thrown backward and downward toward the ends of the pan, as shown in the same figure. When the pipes are all horizontal in position for carrying on the heating, boiling, or evaporating process, the steam entering from the pipe E passes along the upper pipes, C C', and from thence through $e\ e$ and $e'\ e'$ to their respective lower pipes, A A', from which it escapes to the exhaust-pipe D. It is obvious that the steam in its passage from the upper pipes, C C', through the smaller pipes $e\ e$ and $e'\ e'$ to the lower pipes, A A', through the cooler liquor juice or sirup will be considerably cooled, and hence that the expansion of the pipes A A' will be less than that of C C', and that the expansion of the upper parts of the pipes $e\ e$ and $e'\ e'$ will be less than that of the lower parts; but free permission is afforded for this unequal expansion in the pipes A A' and C C' by their only being connected by the smaller pipes $e\ e$ and $e'\ e'$, which have considerable flexibility, and the unequal expansion in the smaller pipes is prevented straining them by the bends in the parts most distant from their respective pipes A A' and C C', and hence no part of the pipes are subject to strain by their unequal expansion.

In the operation of sugar-making it is well known that the process of evaporation is more or less rapid according to the state of the surface of the evaporating-instrument. If the surface of the instrument is foul or incrusted, the evaporation is of course slow and the consumption of fuel increased. Thus there is a waste of time and money. An evaporating-instrument consisting of a coil of pipes so hinged as to be capable of being turned up from a horizontal position in the tub or pan to a perpendicular position for the purpose of being cleaned has proved to be highly practicable and desirable; but this form of evaporating-instrument, though quick in operation when clean, nevertheless becomes rapidly fouled or incrusted, requiring frequent stoppages of the operation for cleaning. Difficulty has also been experienced in keeping the joints tight at the junctions of the steam-pipes. To remedy this, a method of applying ratchet-wheels at said junctions has been patented. By this method any loosening at the joints may be compensated by the ratchets; but the latter, owing to the nature of the substance in which they are immersed, are liable to become soon inoperative. By the employment of two or more independent series of pipes, as in my invention, I am enabled to render the evaporating process almost continuous. While one series is turned up to be cleaned, the other may remain in the pan, and the evaporation may thus proceed almost uninterruptedly.

I do not claim the invention of the swinging or hinged steam-coil for the evaporation of sugar; but,

Having thus described my invention, I claim as new and desire to secure by Letters Patent—

1. The combination, with and within the pan B or its equivalent, of the two independent series of swinging steam-pipes, substantially as herein shown and described, so that while one series is elevated to be cleaned the evaporating process may be continued with the other series, as set forth.

2. The combination of the horizontal pipes A C by means of the arched series of pipes $c$, as and for the purpose herein shown and described, 3. The arrangement of the extremities of the supply-pipes D E and A A' to slide one over the other when the said extremities are combined with the stuffing-boxes $d$ $d'$ $b$ $b'$, attached to the pan B, substantially as herein shown and described, whereby expansion is allowed and leakage prevented, as set forth.

JOHN LARKIN.

Witnesses:
  S. T. GRISAMORE,
  WM. H. RAGAN.